United States Patent [19]
Frederick et al.

[11] Patent Number: 5,742,057
[45] Date of Patent: Apr. 21, 1998

[54] UNITIZED SCINTILLATION DETECTOR ASSEMBLY WITH AXIAL AND RADIAL SUSPENSION SYSTEMS

[75] Inventors: Larry D. Frederick, Huntsville; Larry David Frederick, Jr., Madison, both of Ala.

[73] Assignee: Frederick Energy Products, Huntsville, Ala.

[21] Appl. No.: 642,525

[22] Filed: May 3, 1996

[51] Int. Cl.⁶ ........................... G01T 1/20
[52] U.S. Cl. .................. 250/368; 250/361 R
[58] Field of Search ........................ 250/367, 368, 250/361 R

[56] References Cited

U.S. PATENT DOCUMENTS

| | | |
|---|---|---|
| 2,902,603 | 9/1959 | Ferre . |
| 2,945,955 | 7/1960 | Mossop et al. . |
| 2,949,534 | 8/1960 | Youmans . |
| 3,049,620 | 8/1962 | George et al. . |
| 3,073,954 | 1/1963 | Carlson et al. . |
| 3,950,646 | 4/1976 | Whitlock . |
| 3,960,756 | 6/1976 | Noakes . |
| 4,004,151 | 1/1977 | Novak . |
| 4,158,773 | 6/1979 | Novak ........................ 250/368 X |
| 4,275,298 | 6/1981 | Wykes et al. .................. 250/367 X |
| 4,360,733 | 11/1982 | Novak et al. . |
| 4,383,175 | 5/1983 | Toepke . |
| 4,764,677 | 8/1988 | Spurney ........................ 250/368 X |
| 4,833,320 | 5/1989 | Hurlbut . |
| 4,900,937 | 2/1990 | Dayton et al. . |
| 4,994,673 | 2/1991 | Perna et al. ................... 250/368 X |
| 5,047,635 | 9/1991 | Leaney et al. . |
| 5,070,249 | 12/1991 | White . |
| 5,087,818 | 2/1992 | Bellian et al. . |
| 5,132,539 | 7/1992 | Kwasnick et al. . |
| 5,264,154 | 11/1993 | Akiyama et al. . |
| 5,283,439 | 2/1994 | Bouissou et al. .............. 250/368 |
| 5,317,158 | 5/1994 | McElhaney et al. . |
| 5,332,906 | 7/1994 | Lauf et al. . |
| 5,338,937 | 8/1994 | Daghighian et al. . |
| 5,397,893 | 3/1995 | Minette . |
| 5,408,097 | 4/1995 | Wraight et al. . |
| 5,548,116 | 8/1996 | Pandelisev ................... 250/368 X |

*Primary Examiner*—Edward J. Glick
*Attorney, Agent, or Firm*—Dickstein Shapiro Morin and Oshinsky, LLP

[57] ABSTRACT

A unitized scintillation detector, employing a scintillation element and a photomultiplier tube housed within inner and outer housings for protection against shock, and a scintillation shock assembly. The scintillation element is encased within potting material, which is further enclosed within a rigid shield. A reflective coating or reflective tape may be used to optimize light impulse transmission from the element to the photomultiplier. The element is further protected from shock by an elastomeric boot disposed around the shield and within the housing. In addition, elastomeric material cushions the element on one end and a spring system protects the other end. The spring system is preloaded against the shield, not the element. Dual windows interfacing the scintillation element and photomultiplier tube at the other end of the element create an hermetic seal. In another embodiment, a single optical window may be used. The photomultiplier tube is encased within an elastomer with outwardly directed projections. The photomultiplier tube is protected from radial and axial shock as well as thermal excursions.

26 Claims, 8 Drawing Sheets

UNITIZED SCINTILLATION DETECTOR ASSEMBLY WITH AXIAL AND RADIAL SUSPENSION SYSTEMS

BACKGROUND OF THE INVENTION

The present invention relates generally to electro-optical devices for detecting radiation within a well bore. More particularly, the present invention relates to a support and shock absorbing system for a scintillation detector.

Scintillation detectors are well known in the drilling industry and are often incorporated into drilling tools for oil wells and the like. Scintillation detectors that are used in measurement-while-drilling ("MWD") operations typically include a scintillation crystal element and a photomultiplier tube. Such detectors are included in drill strings near the drill bits. Due to the positioning, such detectors are usually subjected to vibrational shocks in the radial and axial directions.

Various attempts have been made to reduce the effects of shock experienced by scintillation detectors. Some of the efforts were aimed at reducing the shock experienced by the photomultiplier tubes. Examples of such efforts include U.S. Pat. No. 5,070,249 (White) and U.S. Pat. No. 5,120,963 (Robinson). Other efforts were directed to radially cushioning the scintillation element and axially biasing the element toward the photomultiplier tube to create an optical coupling between the element and the photomultiplier tube. Examples of such efforts include U.S. Pat. No. 4,360,733 (Novak), U.S. Pat. No. 4,383,175 (Toepke), U.S. Pat. No. 4,764,677 (Spurney), U.S. Pat. No. 4,900,397 (Dayton), and U.S. Pat. No. 4,994,673 (Perna).

The prior art efforts aimed at protecting the photomultiplier tube are unsatisfactory in several respects and do not address the problem of assuring long-term performance of the fragile scintillation element. In some of the prior art systems, the scintillation element is rigidly connected to the photomultiplier tube through an optical window. The rugged and harsh drilling environment in which scintillation detectors may operate is not conducive for such an arrangement, and the fragile scintillation elements are often damaged by vibrational shock. Furthermore, in traditional arrangements, the optical coupling materials between the scintillation element and the photomultiplier tube are often quickly worn unless relative motion between these elements is limited.

A scintillation element functions by capturing ambient radiation from the well bore. The scintillation element then transforms the radiation into light impulses. These light impulses are then transmitted through an optical window into a photomultiplier tube where the light impulses are received and quantified.

SUMMARY OF THE INVENTION

The problems of the prior art are overcome to a great extent by the present invention, which relates to an axial support system and a radial support system which reduce the relative motion of the various light gathering elements when exposed to high temperatures. The present invention also relates to a scintillation detector with means for receiving and transforming radiation into light impulses, means for receiving and quantifying the light impulses and an improved support means around the light impulse receiving and quantifying means.

In accordance with a preferred embodiment of the present invention, a unitized scintillation detector is provided wherein the radiation receiving and transforming means and the light impulse receiving and quantifying means are protected. The unitized scintillation detector is housed within a unitized scintillation detector housing.

The light impulse receiving and quantifying means is immediately encased within an elastomeric material including a plurality of outward projections. The elastomeric material is itself encased within an inner housing including a plurality of openings in its circumference. The inner housing is surrounded by an elastomeric boot.

The openings in the inner housing receive the outward projections of the elastomeric material. This arrangement allows the outward projections to provide radial support to the light impulse receiving and quantifying means, while also helping to keep such means centered within the unitized scintillation detector housing.

In another aspect of the present invention, a system is provided for protecting the radiation receiving and transforming means against physical shock and moisture contamination. Included within the scintillation detector is a rigid scintillation shield, a series of radially disposed shock absorbing means, an optical coupling transparent to light impulses, an end cap and a scintillation detector housing.

In a preferred embodiment of the invention, the scintillation element is encased within the scintillation shield. A potting material may also be placed around the scintillation element within the shield. The shield itself is radially supported within the scintillation detector housing by the series of radially disposed shock absorbing means.

The shield is axially loaded toward the optical coupling by the end cap. In this fashion, the scintillation crystal is positioned toward the optical coupling without being placed under undue stress.

The optical coupling may be formed of two optical windows and at least two elastomeric interfaces. One of the optical windows is bonded to the shield. Hermetic seals at the optical window bonded to the shield and at the end cap prevent moisture from leaking in and contaminating the scintillation element.

An object of the present invention is to protect the fragile scintillation element and photomultiplier tube from vibrational shock in a manner that assures long-term reliability.

Another object of the invention is to reduce the motion of the scintillation element relative to the exterior housing, to thereby reduce the production of triboluminescence under high vibrational shock.

Another object of the invention is to reduce the shock-induced motion of the photomultiplier tube, which enhances its ability to receive and quantify the light impulses. Thus, with the present invention, the light output performance of a photomultiplier tube may be improved.

Other benefits and advantages of the present invention will become apparent to those skilled in the art upon a reading and understanding of the following specification.

BRIEF DESCRIPTION OF THE DRAWINGS

A fuller understanding of the invention may be had by referring to the following description and claims taken in conjunction with the accompanying drawings, wherein:

DETAILED DESCRIPTION OF PREFERRED EMBODIMENTS

Figure 1:
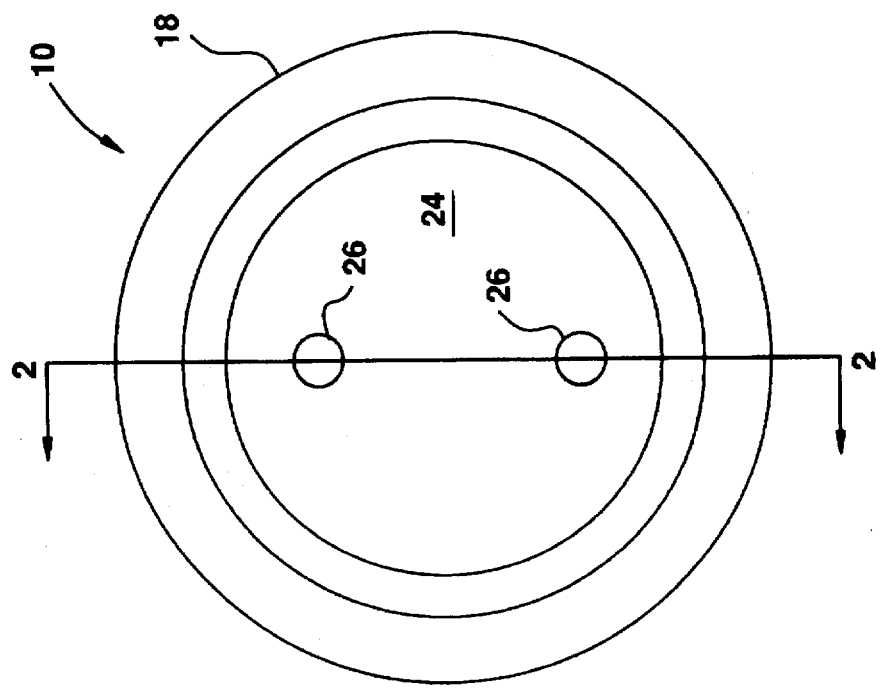
FIG. 1 is an end view of a downhole detector assembly constructed in accordance with a preferred embodiment of the present invention.
Figure 2:
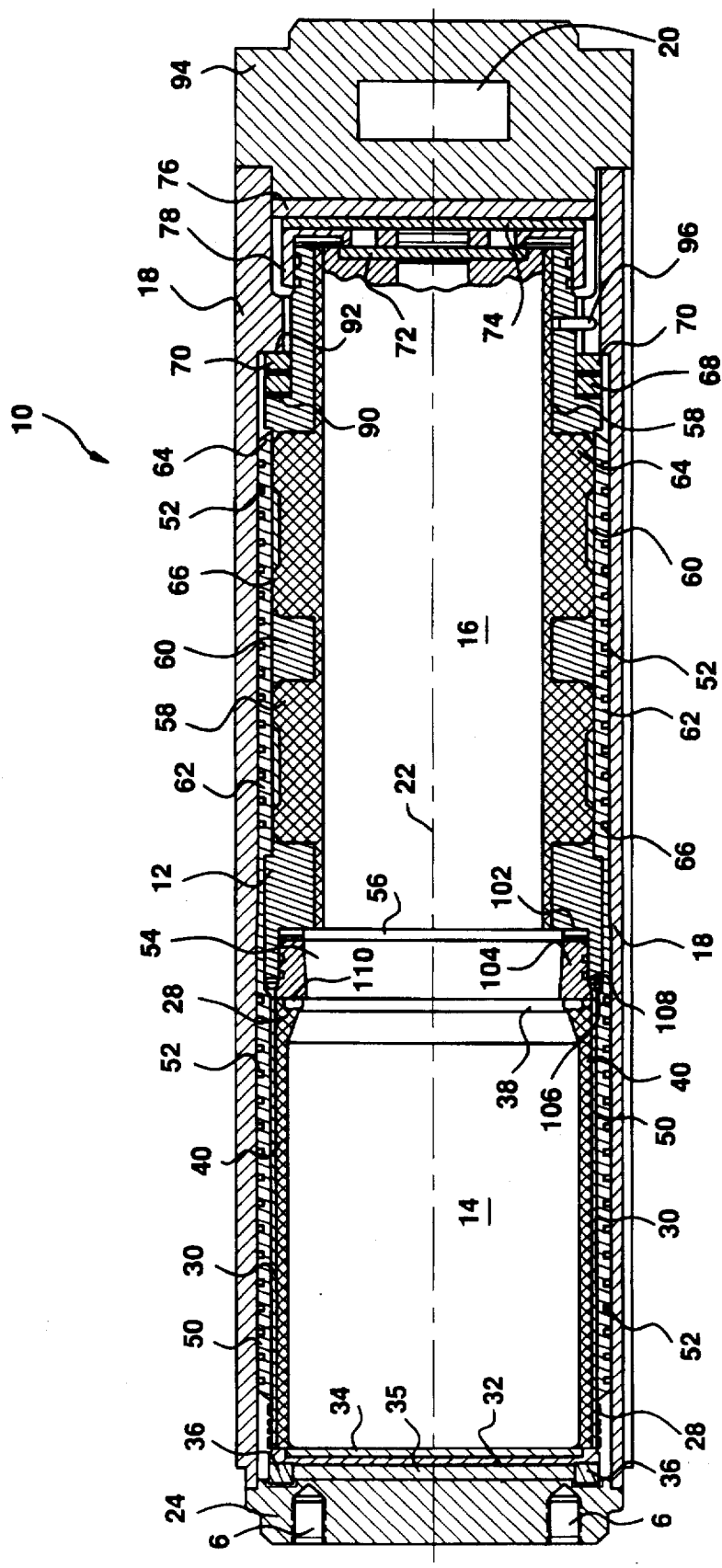
FIG. 2 is a cross-sectional view of the downhole detector assembly of FIG. 1, taken along line 2—2.

Referring now to the drawings, where like reference numerals indicate like elements, there is shown in FIGS. 1 and 2 a unitized scintillation detector assembly 10 constructed in accordance with the principles of the present invention. The assembly 10 includes a unitized scintillation shock assembly 12, which includes a scintillation element 14 and a photomultiplier tube 16. The shock assembly 12 is located within a detector housing 18. It should be understood that the present invention is usable in MWD applications as well as numerous other applications such as environmental measurements made by drilling into the earth, scientific probes in harsh environments such as on the surface of other planets, and harsh commercial and industrial applications such as nuclear plants.

The scintillation element 14 is preferably a sodium-iodide (NaI) crystal. The element 14 receives radiation from the well bore (not shown), transforms the radiation into light impulses and transmits the light impulses to the photomultiplier tube 16. The photomultiplier tube 16 receives and quantifies the light impulses and transmits information pertaining to the light impulses to an electronic assembly 20 (discussed in more detail below).

All of the elements of the detector assembly 10 are cylindrical or annular and are axially symmetric about a longitudinal axis The unitized nature of the shock assembly 12 allows for complete refurbishment and/or replacement of the shock assembly 12, the scintillation element 14 and the photomultiplier tube 16 in the field.

Enclosing one end of the detector assembly 10 is a scintillation element end retainer 24 which is fastened to the housing 18 by fasteners 26. The housing 18 is preferably made out of a beryllium-aluminum hybrid material but may be made out of any other suitable material.

Surrounding the scintillation element 14 is a potting material 28. The material 28 has shock absorbing properties, and may be made of a suitable elastomer. The material 28 may be in powder form. The material 28 is encased within a scintillation shield 30. The shield 30 is open at both ends.

A scintillation element end plate 32 is attached to the open end of the scintillation shield 30 closest to the end retainer 24. Sandwiched between the scintillation element 14 and the end plate 32 is a first scintillation element expansion pad 34. Located between the end plate 32 and the end retainer 24 is a second scintillation element expansion pad 35. Positioned radially exterior to the second expansion pad 35 are a plurality of scintillation element compression springs 36. A transparent elastomeric layer 38 is positioned on the other end of the element 14.

The elastomeric layer 38, the expansion pads 34, 35 and the compression springs 36 provide axial support and cushioning for the element 14. In addition, the expansion pad 34 and the elastomeric layer 38 provide expansion room for the scintillation element 14. This expansion room is required due to the high thermal environments within which the unitized scintillation detector assembly 10 is to be utilized. The thermal coefficient of expansion for the element 14 is substantially different than that of the other materials of the detector assembly 10.

Completely wrapped around the element 14, within the potting material 28, is a reflective tape 40. The tape 40 reflects light impulses and enhances their transmission into the photomultiplier tube 16, which is positioned beyond the elastomeric layer 38.

Sandwiched in between the shield 30 and the exterior housing 18 is an annular boot 50. The boot 50 has treads 52 for providing axial traction. The boot 50 and the potting material 28 provide radial cushioning for the scintillation element 14.

The light impulses transformed by the scintillation element 14 are transmitted through the elastomeric layer 38, through an optical window 54, then through a transparent photomultiplier tube elastomeric layer 56 (described in more detail below) and then into the photomultiplier tube 16.

The photomultiplier tube 16 is encased within elastomeric element 58, which is further encased within a photomultiplier tube housing 60.

Sandwiched between the housing 60 and the unitized detector housing 18 is an elastomeric boot 62. The boot 62 (like the boot 50 surrounding the scintillation element 14) has treads 52 for providing axial traction.

As a way of centralizing the photomultiplier tube 16 within the unitized detector housing 18 and to provide radial cushioning for the photomultiplier tube 16, the photomultiplier tube elastomeric element 58 includes a plurality of outwardly extending projections 64. The photomultiplier tube housing 60 additionally has a plurality of openings 66. The projections 64 fit into the openings 66.

The photomultiplier tube 16 is axially supported and cushioned by compression springs 68 and spacers 70, photomultiplier tube pads 72, 74 and 76, and a compression cap 78.

The photomultiplier tube housing 60 includes a projecting shelf 90. In close proximity to the shelf 90 is a second projecting shelf 92, which is part of the unitized detector housing 18. The compression springs 68 and the spacers 70 are positioned between the two shelves 90, 92.

The compression cap 78 and the photomultiplier tube pads 72, 74, 76 are located at the end of the photomultiplier tube 16 farthest from the optical window 54. The first pad 72 is sandwiched between one end of the photomultiplier tube 16 and the compression cap 78. The compression cap 78 is threadedly attached to the housing 62 to provide the desired fit of the photomultiplier tube 16 to the elastomer layer 56.

The photomultiplier tube second pad 74 is positioned on the opposite side of the compression cap 78 from the first pad 72. The second pad 74 is sandwiched between the photomultiplier tube third pad 76 and the compression cap 78. The second and third pads 74, 76 structurally isolate the compression cap 78 from a photomultiplier tube end retainer assembly 94 (described in detail below). The compression cap 78 axially biases the photomultiplier tube 16 toward the optical window 54.

To prevent the photomultiplier tube 16 from rotating within the unitized detector housing 18, an anti-rotation pin 96 is positioned within the photomultiplier tube housing 60. The pin 96 fits into respective radial openings in the housings 18, 60.

The end retainer 94 is located at the end of the unitized detector assembly 10 farthest from the element 14. An electronics assembly 20 (shown schematically) may be located within the retainer 94. The retainer 94 is fastened to the unitized detector housing 18 by fasteners 100 (shown in FIG. 4).

At the end of the photomultiplier tube housing 60 closest to the optical window 54 is a photomultiplier tube housing surface 102. The photomultiplier tube elastomer layer 56 is sandwiched between the surface 102 and the optical window 54.

A glass/metal seal assembly 104, which includes a glass/metal seal assembly outer projection 106 projecting outwardly, is positioned radially exterior to the optical window 54. The assembly 104, which interfaces the surface 102 along with the elastomer layer 56, is positioned such that there is a space between one end of the housing 60 and the projection 106. The projection 106 fits between one end of the photomultiplier tube housing 60 and one end of the scintillation shield 30. Within the space between those two ends is fitted a window assembly lock ring 108 which encircles the assembly 104. The assembly 104 is conjoined to the optical window 54 by a plurality of window assembly fasteners 110.

As radiation exits the well bore (not shown) and enters the scintillation element 14, the scintillation element 14 transforms the radiation into light impulses. The light impulses are transmitted through the scintillation element transparent elastomeric layer 38, the optical window 54, the photomultiplier tube elastomer layer 56 and into the photomultiplier tube 16. The reflective tape 40 helps to prevent the light impulses from exiting the unitized scintillation detector assembly 10 and focuses the light impulses through both optical elastomer layers 38, 56 and the optical window 54 and into the photomultiplier tube 16.

The photomultiplier tube 16 is axially biased toward the optical window 54 by the compression cap 78. This arrangement, along with the anti-rotation pin 96, helps to maintain the position of the photomultiplier tube 16 and optimize the light impulse receiving capabilities of the photomultiplier tube 16. The photomultiplier tube 16 receives and quantifies the light impulses. The photomultiplier tube 16 transmits the ascertained quantity of light impulses to the electronics assembly 20, which further transmits this information to controllers on the ground.

Figure 3:
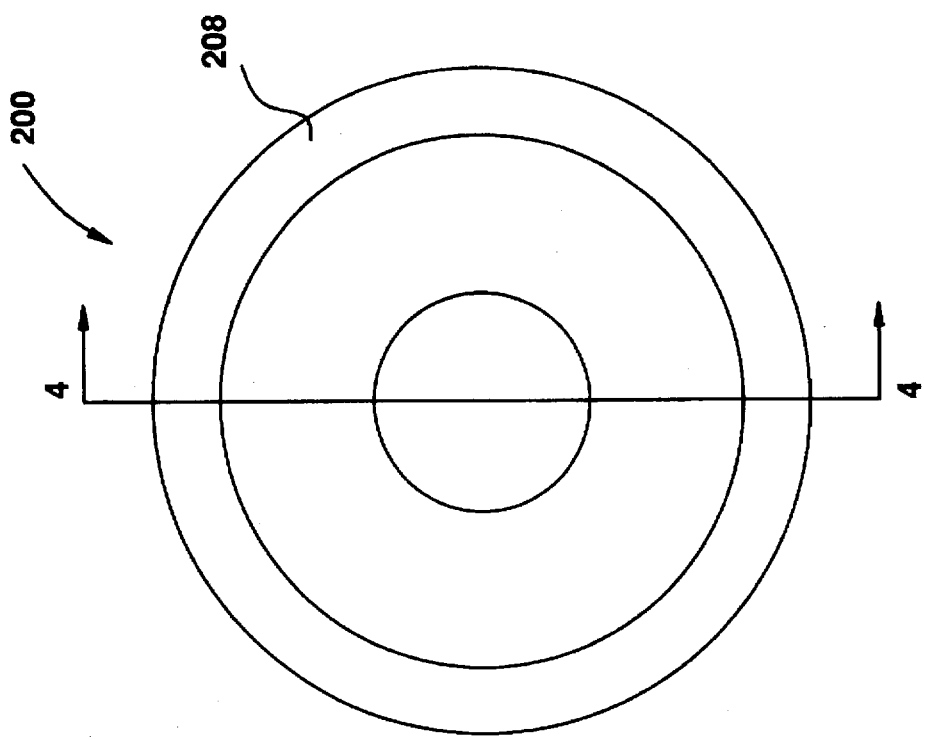
FIG. 3 is an end view of a downhole detector assembly constructed in accordance with a second embodiment of the present invention.
Figure 4:
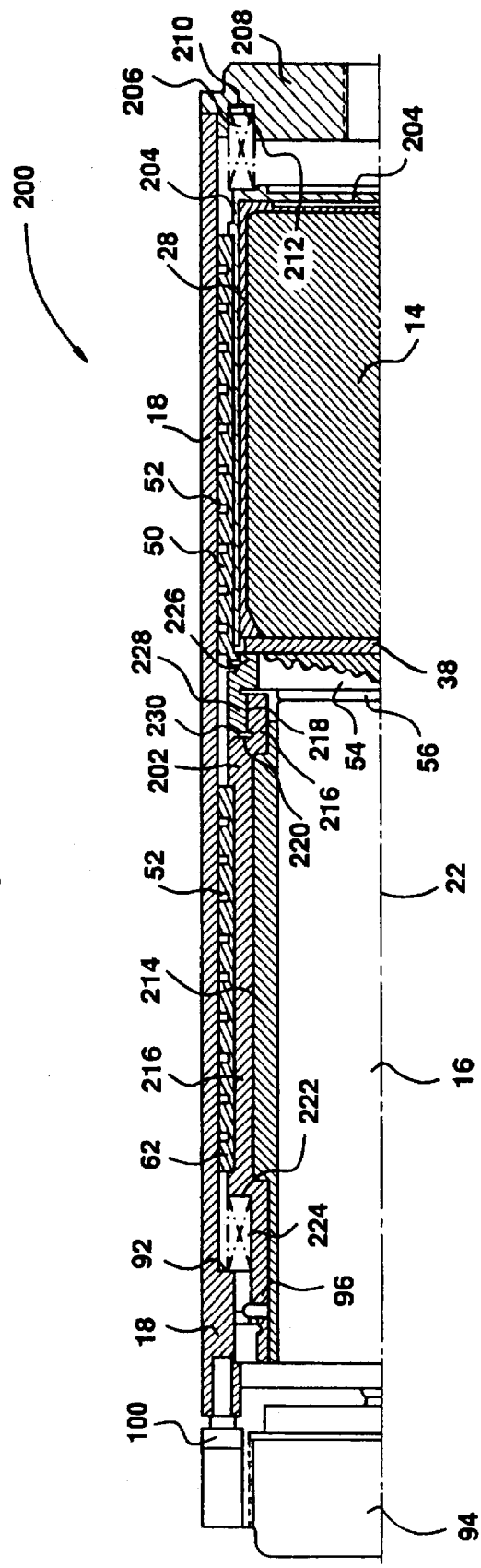
FIG. 4 is a partial cross-sectional view of the downhole detector assembly of FIG. 3, taken along line 4—4.

A second embodiment of the present invention, as shown in FIGS. 3 and 4, includes a unitized scintillation detector assembly 200. Within the unitized scintillation detector assembly 200 is a unitized scintillation shock assembly 202. Included within the unitized scintillation shock assembly 202 is a scintillation element 14 and a photomultiplier tube 16. The scintillation element 14 is encased within the potting material 28, which is itself encased within a scintillation shield 204.

The shield 204 encloses all but one side of the scintillation element 14, that side being the end of the element 14 closest to the scintillation element transparent elastomeric layer 38. The element 14 is axially supported and cushioned by the elastomeric layer 38 and by a scintillation element axial spring 206. The spring 206 is sandwiched between the shield 204 and a scintillation element end retainer 208. On the face of the end retainer 208 closest to the shield 204 is a scintillation element end retainer groove 210. Within the groove 210 is positioned a scintillation element shim 212. The spring 206 is positioned such that it fits within the groove 210 and interfaces with the shim 212, while the other end of the spring 206 interfaces with an end of the shield 204. In this manner, the element 14 is axially biased towards the elastomer layer 38.

The photomultiplier tube 16 is located on the other side of the detector assembly 200 from the element 14. The photomultiplier tube 16 is positioned within a photomultiplier tube elastomeric element 214, which is itself positioned within a photomultiplier tube housing 216. The housing 216 is positioned within a photomultiplier tube elastomeric boot 62. A photomultiplier tube housing threaded portion 218 and a lock ring interface 220 are located on an end of the housing 216 closest to the element 14. A photomultiplier tube housing shelf 222 is located on an end of the housing 216 farthest from the element 14. A photomultiplier tube axial spring 224 is positioned between the shelf 222 and a second shelf 92 located in the unitized scintillation detector housing 18. Additionally, an anti-rotation pin 96 is included within the housing 216 to prevent the photomultiplier tube 16 from rotating within the detector housing 18.

A photomultiplier tube elastomer layer 56 is sandwiched between an end of the photomultiplier tube 16 and the optical window 54. The optical window 54 is itself sandwiched between the elastomer layer 56 and the scintillation element elastomer layer 38. A glass/metal seal assembly 226 is located radially exterior to the optical window 54. A screw thread interface 225 is located on an internally directed face of the assembly 226.

Additionally, a lock ring 230 is located on the assembly 226. The lock ring 230 interfaces with the lock ring interface 220 of the housing 216. In addition, the screw thread interface 228 threadedly interfaces with the threaded portion 218. The side of the assembly 226 closest to the scintillation element 14 interfaces with one end of the shield 204. Through this arrangement, the photomultiplier tube 16, the optical window 54 and the element 14 are all unitized within the scintillation shock assembly 202. Because of this, the assembly 202 can be removed as one unit through the scintillation element end retainer 208.

Figure 5:
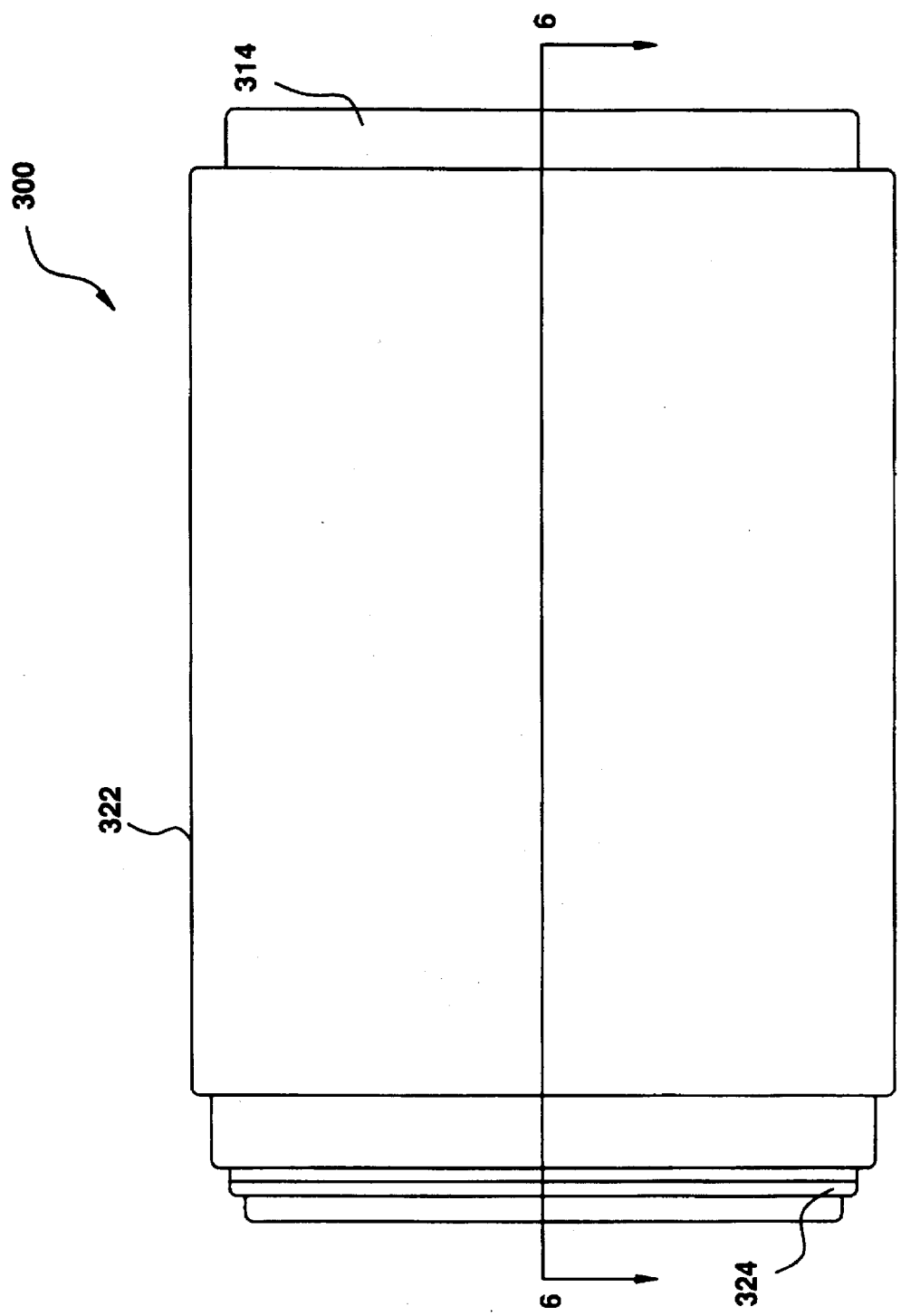
FIG. 5 is a side view of a scintillation shock assembly constructed in accordance with a third embodiment of the present invention.
Figure 6:
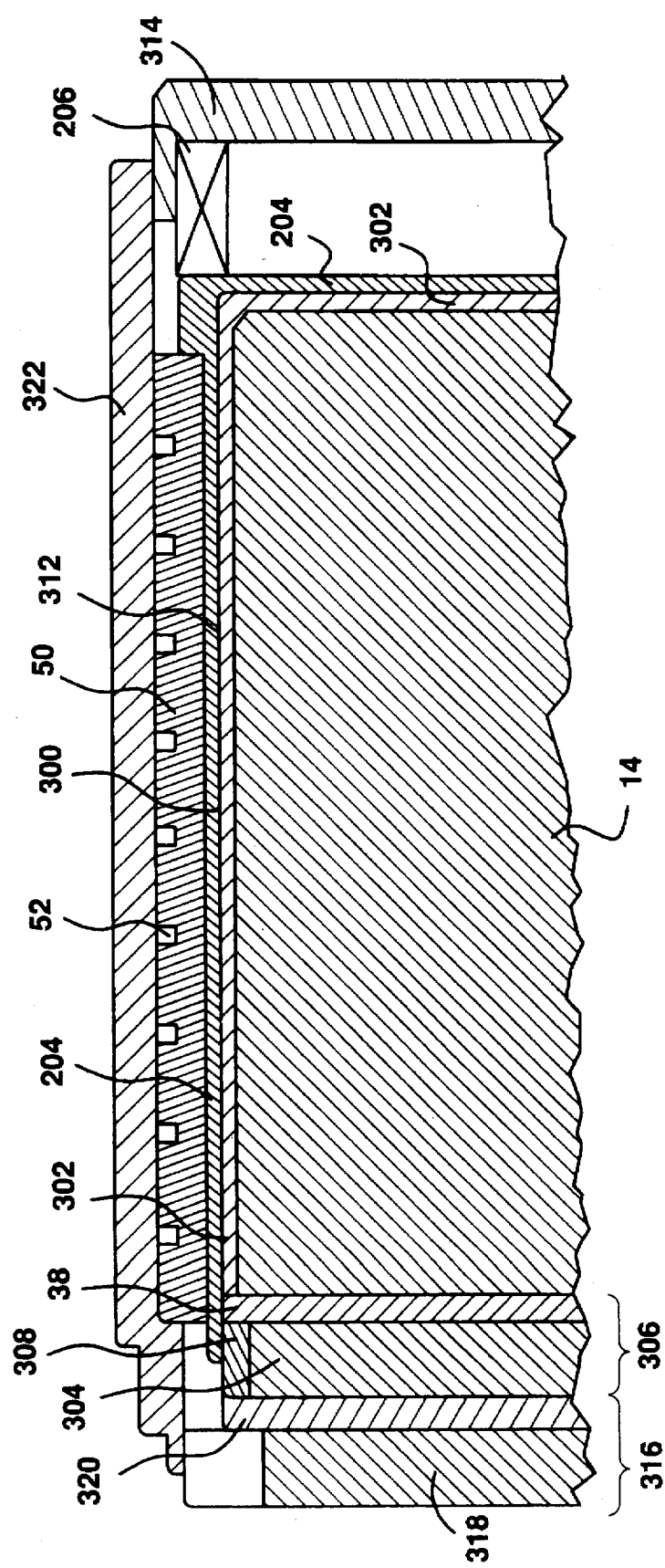
FIG. 6 is a partial cross-sectional view of the assembly of FIG. 5, taken along the line 6—6.

With regard to FIGS. 5–6, a third embodiment of the present invention is one including a scintillation shock assembly 300. The shock assembly 300 includes the scintillation element 14.

The element 14 is encased within a potting material 302 which is made of an elastomer and may be in powder form. The potting material 302 covers all sides of the element 14 with the exception of the end closest to the photomultiplier tube 16. The potting material 302 is optically matched to the element 14, optically transparent to visible light and chemically non-reactive with its interfacing surfaces. In addition, the potting material 302 allows for thermal expansion of the element 14.

Both the element 14 and the potting material 302 are encased within the rigid scintillation shield 204, which is open at one end. In lieu of shield 204, the scintillation shield 30 and the end plate 32, as shown in FIG. 2, may be utilized.

A scintillation element optical window 304 is disposed at the open end of the shield 204. Sandwiched between the window 304 and the element 14 is the scintillation element transparent elastomeric layer 38. The window 304 and the elastomeric layer 38 make up a first optical coupling 306 adjacent to the element 14. The elastomeric layer 38 allows light impulses to be emitted from the element 14 through the window 304. In addition, the elastomeric layer 38 acts as a buffer between the element 14 and the window 304 to protect the element 14 from axially directed vibrational shock.

The window 304 is sealed to the shield 204 through the use of a scintillation element glass/metal seal 308. The seal 308 is hermetically welded to the shield 204. In addition, the window 304 has an hermetic seal about its circumference.

The interior surfaces of the shield 204 (the surfaces closest to the potting material 302) may have a light reflective coating 312 applied to them. The coating has an index of refraction greatly different from the potting material 302 to reflect internally generated light of the element 14, thereby improving the light impulse output from the element 14 to the photomultiplier tube 16 (shown in FIG. 2). Alternative to or in conjunction with the coating 312, reflective tape 40, as shown in FIG. 2, may be wrapped around the element 14. Because the potting material 302 is preferably optically transparent, it will simulate the optical benefits of having direct contact between the element 14 and a reflective surface without having direct vibration and shock loading impinging on the element 14.

The scintillation shock assembly 300 circumferentially supports the element 14 by radially disposed shock absorbers 50. These shock absorbers may include an elastomeric boot. The selection and geometry of the shock absorbers 50 are interchangeable and are a function of vibration and thermal design environments. The preferred material for the shock absorbers 50 for most applications is Viton. The shock absorbers 50 function to protect the element 14 from vibration and shock.

In conjunction with the scintillation element transparent elastomeric layer 38, further support and protection from axially directed vibration and shock is provided by a scintillation element axial spring 206, which is disposed outside the end of the shield 204 opposite from the window 304. The spring 206 is pre-loaded against the scintillation shield 204 via a scintillation element end retainer 314. Hence, the spring pre-load of the spring 206 is directed at the entire shock assembly 300 instead of being focused entirely on the scintillation element 14. The end retainer 314 also creates an hermetic seal.

There are two optical couplings between the element 14 and the photomultiplier tube 16. The first optical coupling 306 has already been described, namely the elastomeric layer 38 and the window 304. A second optical coupling 316 includes a photomultiplier tube window 318 and photomultiplier tube transparent elastomeric interface 320. The interface 320 is sandwiched between the two windows 304, 318. The first optical coupling 306 creates an optical couple between the element 14 and the window 304 within the shock assembly 300. The second optical coupling 316 creates an optical couple between the shock assembly 300 and the photomultiplier tube 16.

Completely surrounding the scintillation shock assembly 300 is a scintillation detector housing 322. Element 14 is floated within shock absorbing material (the potting material 302) within a shield 204 that has its own window 304, and the complete shock assembly 300 is resiliently isolated within the housing 322. The illustrated arrangement results in greatly reduced motion between the element 14 and the housing 322. Reduced relative motion of the element 30 in turn reduces the production of triboluminescence under high vibration and shock conditions.

In addition, due to the method of suspending the element 14 described above, the loading that is introduced to the shock assembly 300 is resolved in a distributed manner. This manner minimizes bending and point loading of the element 14, thereby allowing the element 14 to withstand more severe vibrational and shock environments.

The characteristics of the axially disposed spring 206, as well as the radially disposed shock absorbers 50 may be modified to dynamically tune the shock assembly 300 away from dominant external input frequencies both axially and radially.

Figure 7:
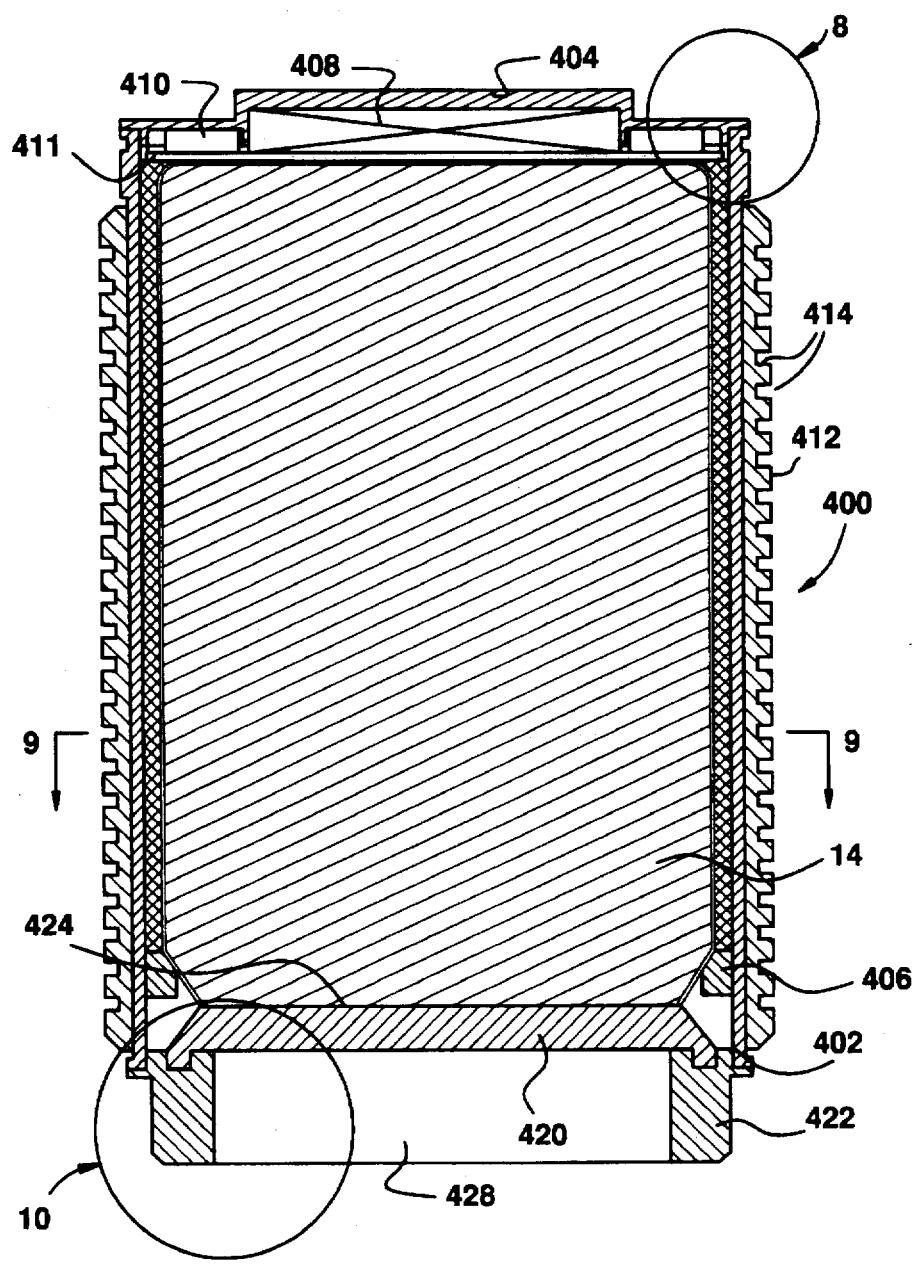
FIG. 7 is a side view of a crystal assembly constructed in accordance with a fourth embodiment of the present invention.
Figure 8:
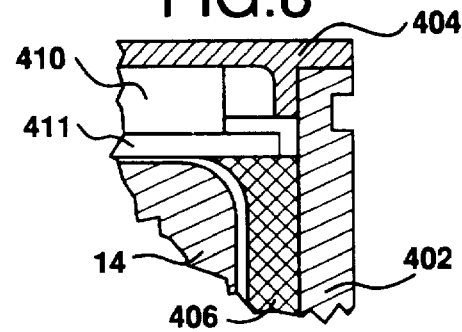
FIG. 8 is an enlarged partial view showing the area encircled by dashed line 8 in FIG. 7.

A fourth embodiment of the present invention is shown in FIGS. 7–10 including a crystal assembly 400. Crystal assembly 400 includes the scintillation element 14 as shown in FIGS. 7–8. It should be understood that the axial suspension described below with respect to the fourth embodiment is usable for embodiments 1–3 described above and is the preferred embodiment for the axial suspension system.

Scintillation element 14 is housed within a scintillation shield 402. Enclosing one end of scintillation shield 402 is a scintillation element end retainer 404 which is attached to the scintillation shield by welding. Shield 402 is open at its opposite end.

Surrounding the scintillation element 14 is a potting material 406. The material 406 has shock absorbing properties, and may be made of a suitable elastomer such as silicone. The material 406 is encased within scintillation shield 402.

Sandwiched between scintillation element 14 and scintillation shield element and retainer 404 is a metallic spring 408 adjacent to retainer 404 and an elastomeric pad 410 adjacent to element 14.

The metallic spring 408 and elastomeric pad 410 provide axial support and cushioning for the element 14. In addition, the metallic spring 408 and elastomeric pad 410 provide expansion room for the scintillation element 14. The metallic spring 408 and elastomeric pad 410 provide a pre-load on scintillation element 14 through a circular shim 411 mounted between spring 408, pad 410 and element 14.

The elastomeric pad 410 and spring 408 also provide a two-stage loading on the scintillation element 14. The spring 408 is sized to provide a constant minimum force on scintillation element 14 that is sufficient to maintain adequate load during ambient and sub-ambient conditions.

The elastomeric pad 410, concentric with the metallic spring 408 and disposed outwardly therefrom, is positioned so as to begin assuming load at elevated temperatures. Such a combination allows the scintillation element to deflect the required amount without developing prohibitive forces while at the same time being assured an adequate preload force is present at or below ambient temperatures.

Disposed radially beyond scintillation shield 402 is an annular boot 412. The boot 412 has treads 414 for providing axial traction against a scintillation housing (not shown). Annular boot 412 is bonded to scintillation shield 402 using contact cement.

Figure 9:
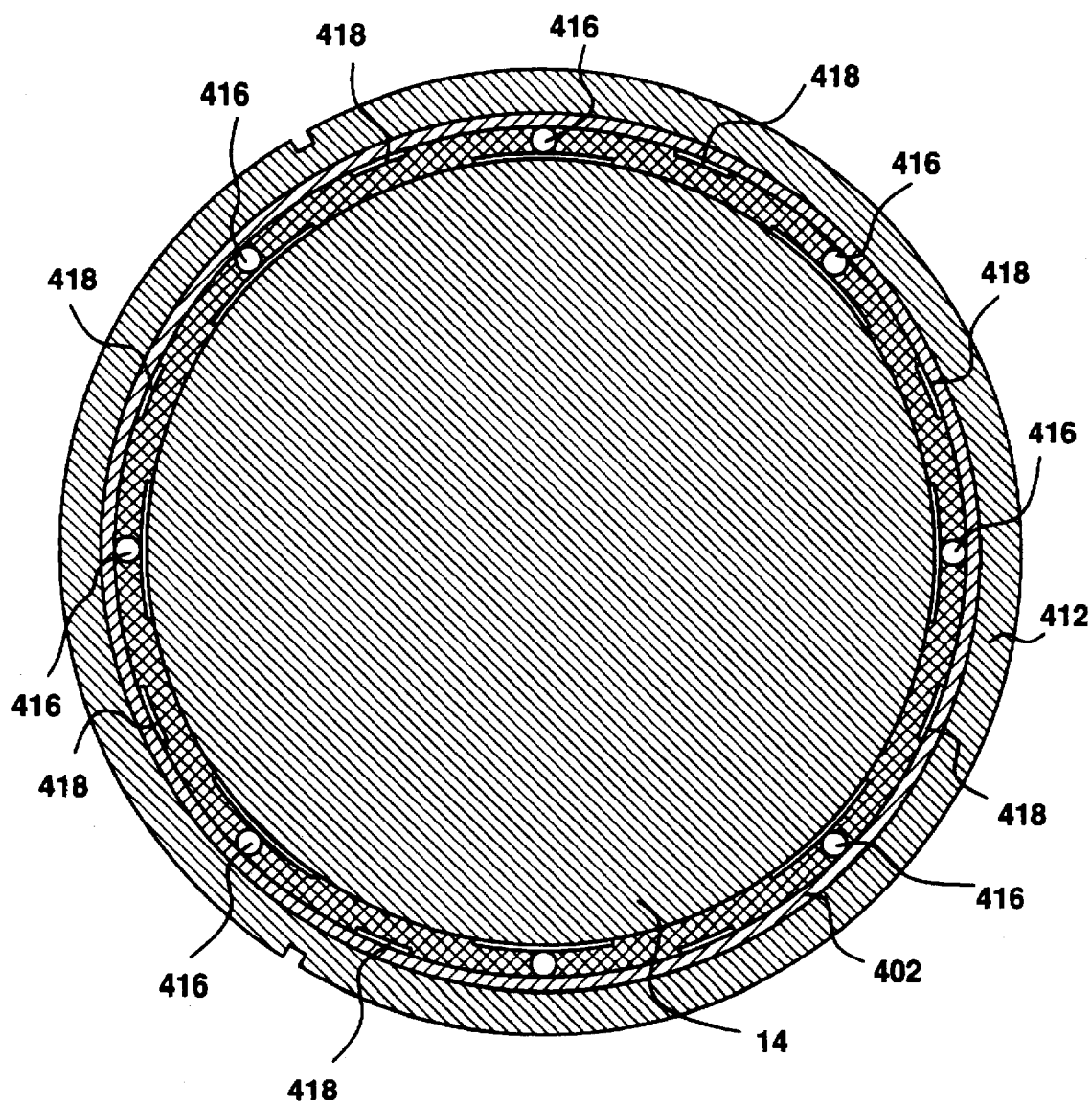
FIG. 9 is a cross-sectional view of the assembly of FIG. 7, taken along the line 9—9.

Referring now to FIG. 9, a plurality of equally circumferentially spaced potting voids 416 are formed after potting material 406 has been set between scintillation element 14 and scintillation shield 402. These potting voids 416 allow for thermal expansion of scintillation element 14. Although eight potting voids 416 are shown, any number may be used. Also circumferentially spaced are a plurality of radial springs 418 which are installed after potting material 406 has set. Radial springs 418 are generally installed flat and become arched as shown in FIG. 9 but may also be preformed into an arch configuration depending on the nature of the application. Radial springs 418 are generally equally circumferentially spaced between potting voids 416. The springs 416 impose a radial preload in localized areas compensating for the different coefficients of thermal expansion of the elements of the crystal assembly 400.

Disposed on the open side of scintillation shield 402 is an optically transparent optical coupling 420 and a seal assembly positioned between optical coupling 420 and scintillation shield 402.

Figure 10:
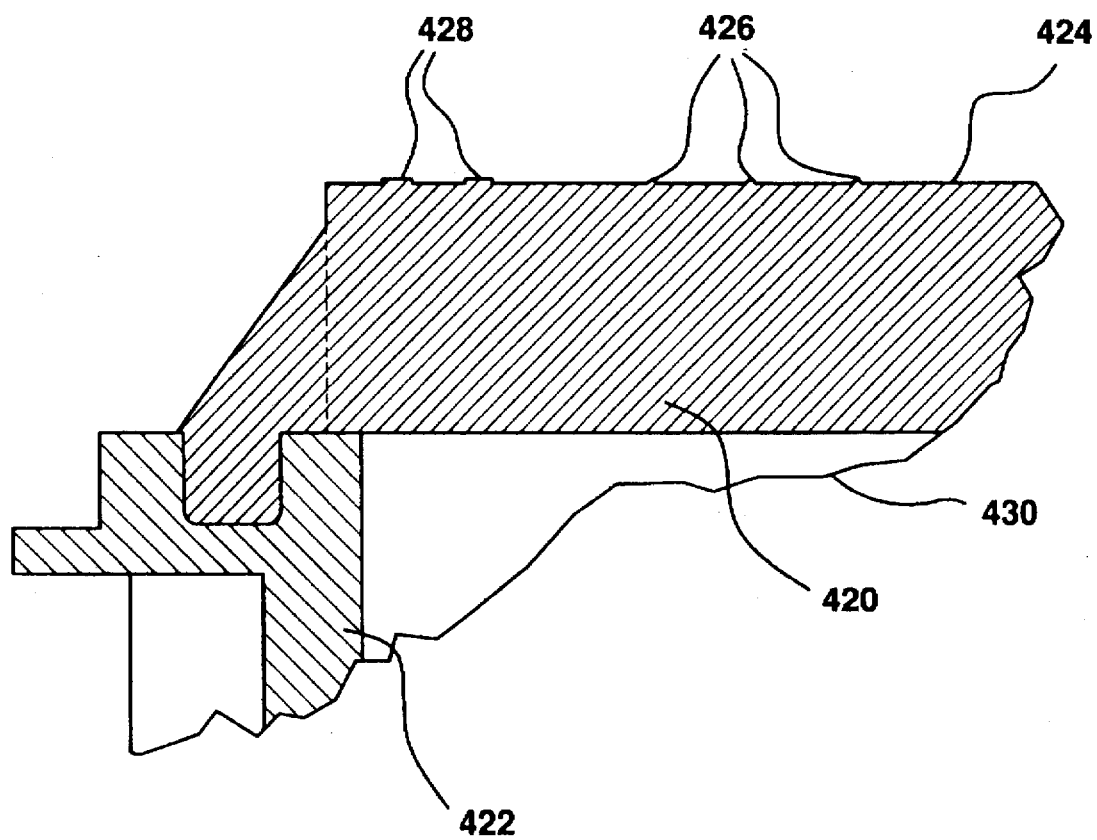
FIG. 10 is an enlarged partial view showing the area encircled by dashed line 10 in FIG. 7.

Refer now to FIG. 10 wherein an enlarged view of optical window 420 is shown. Optical window 420 has a surface 424 adjacent to scintillation element 14 not shown). Extending outwardly from surface 424 are a plurality of concentric ridges 426, 428. Ridges 426 are triangularly shaped and ridges 428 have a flat surface 430 extending generally parallel to surface 424. As shown in FIG. 10, ridges 428 are disposed radially outwardly relative to ridges 426. Ridges 426, 428 serve to retain a lubricant which is placed between optical coupling 420 and scintillation element 14.

Disposed within seal assembly 422 is an optical window 428. The optical window 428 is bonded to optical coupling 420 at surface 430 thereof.

The present disclosure includes that which is contained in the appended claims as well as the foregoing description. Although this invention has been described in its preferred form with a certain degree of specificity, it is understood that numerous changes and other obvious embodiments are included and that the present disclosure of the preferred form has been made only by way of example.

For example, while a scintillation element is denoted, it is to be understood that any element capable of receiving radiation from the well bore and transforming that radiation into light impulses is to be understood as being within the scope of the present invention. Also, although a photomultiplier tube is noted, it is to be understood that the present invention includes all such devices that can receive and quantify light impulses.

The combination and arrangement of parts may be resorted to without departing from the spirit and the scope of the invention as hereinafter claimed.

We claim:

1. A unitized scintillation shock assembly including:
   means for receiving and transforming radiation into light impulses;
   means for receiving and quantifying said light impulses;
   elastomeric material surrounding said light impulse receiving and quantifying means;
   an inner housing surrounding said elastomeric material;
   an optical coupling positioned between said radiation receiving and transforming means and said light impulse receiving and quantifying means;
   a compression cap located at an end of said light impulse receiving and quantifying means farthest from said optical coupling;
   a first pad positioned between said light impulse receiving and quantifying means and said compression cap;
   said elastomeric material including a plurality of outwardly extending projections surrounding said light impulse receiving and quantifying means;
   a plurality of openings through said inner housing, said openings receiving said projections; and
   wherein said compression cap axially biases said light impulse receiving and quantifying means toward said optical coupling.

2. A unitized scintillation shock assembly according to claim 1, further including:
   a rigid scintillation shield receiving said radiation receiving and transforming means, said shield having an open end; and
   radially disposed shock absorbing means, wherein said shield is radially supported by said shock absorbing means.

3. A unitized scintillation detector according to claim 2, wherein said radiation receiving and transforming means includes a scintillation element, and wherein reflective tape surrounds said scintillation element within said shield.

4. A unitized scintillation detector comprising:
   means for receiving and transforming radiation into light impulses;
   means for receiving and quantifying said light impulses;
   a unitized scintillation detector housing surrounding said radiation receiving and transforming means and said light impulse receiving and quantifying means;
   elastomeric material surrounding said light impulse receiving and quantifying means, said elastomeric material including a plurality of outwardly extending projections;
   an inner housing surrounding said elastomeric material, said inner housing defining openings receiving said projections; and
   an elastomeric boot positioned between said inner housing end said unitized scintillation detector housing.

5. A unitized scintillation detector according to claim 4, wherein said light impulse receiving and quantifying means includes a photomultiplier tube.

6. A unitized scintillation detector according to claim 4, further including an hermetically sealed optical window assembly and an end cap, said optical window assembly being positioned between said light impulse receiving and quantifying means and said radiation receiving and transforming means, said end cap being positioned at an end of said light impulse receiving and quantifying means farthest from said optical window assembly.

7. A unitized scintillation detector according to claim 6, further including:
   a first pad positioned between said light impulse receiving and quantifying means and said end cap;
   a compression cap positioned between said first pad and said end cap;
   second and third pads positioned adjacent to one another and between said compression cap and said end cap; and
   wherein said compression cap axially biases said light impulse receiving and quantifying means toward said optical window assembly, and wherein said pads provide additional axial support and cushioning for said light impulse receiving and quantifying means.

8. A unitized scintillation detector according to claim 7, wherein said inner housing includes an inwardly projecting surface at an end closest to said optical window assembly.

9. A unitized scintillation detector according to claim 8, wherein said optical window assembly includes:
   an optical window transparent to said light impulses;
   a glass/metal seal assembly positioned circumferentially outwardly of said optical window, said seal assembly including an outer projection and a plurality of fastening pins;
   a lock ring positioned circumferentially outwardly of said optical window between an end of said inner housing and said seal assembly outer projection;

a first elastomeric interface transparent to said light impulses positioned between said optical window and said light impulse receiving and quantifying means; and a second elastomeric interface transparent to said light impulses positioned between said optical window and said radiation receiving and transforming means.

10. A unitized scintillation detector according to claim 4, wherein said unitized scintillation detector housing includes an inwardly projecting shelf, and wherein said inner housing includes a projecting shelf, and further including spacers and compression springs mounted between said shelves, said spacers and compression springs providing additional axial support for said light impulse receiving and quantifying means.

11. A unitized scintillation detector comprising:

a scintillation element for receiving radiation and transforming said radiation into light impulses;

a photomultiplier tube for receiving and quantifying said light impulses;

a unitized scintillation detector housing surrounding said photomultiplier tube and said scintillation element;

potting material surrounding said photomultiplier tube;

an inner housing positioned between said potting material and said detector housing;

an anti-rotation pin, said anti-rotation pin being positioned within said inner housing to prevent said photomultiplier tube from rotating within said detector housing; and an elastomeric boot positioned between said detector housing and said inner housing.

12. A unitized scintillation detector according to claim 11, further including:

an optical coupling transparent to said light impulses, said coupling including an elastomeric interface and an optical window, said optical window being positioned between said photomultiplier tube and said scintillation element, said elastomeric interface being positioned between said optical window and said photomultiplier tube; and an end cap positioned at an end of said photomultiplier tube farthest from said optical coupling.

13. A unitized scintillation detector according to claim 12, further including:

an axial spring for axially supporting said photomultiplier tube;

wherein said unitized scintillation detector housing includes a first inwardly projecting shelf and said inner housing includes a projecting shelf, said spring being located between said shelves.

14. A unitized scintillation detector according to claim 13, further including:

a glass/metal seal assembly; and a lock ring;

said inner housing further including a threaded portion and a lock ring interface at an end closest to said optical coupling, wherein said glass/metal seal assembly is threadedly connected to said threaded portion, said lock ring being located within said lock ring interface.

15. A scintillation shock assembly comprising:

means for receiving and transforming radiation into light impulses;

a rigid scintillation shield, said radiation receiving and transforming means being located within said shield, said shield having an open end;

a first optical coupling transparent to said light impulses;

a scintillation detector housing surrounding said shield and said radiation receiving and transforming means;

radially disposed shock absorbing means, wherein said shield is radially supported within said detector housing by said shock absorbing means; and an end cap for axially biasing said shield toward said first optical coupling, said end cap being attached to said housing.

16. A scintillation shock assembly according to claim 15, wherein said radiation receiving and transforming means includes a scintillation element.

17. A scintillation shock assembly according to claim 16, further comprising a spring disposed between said end cap and said radiation receiving and transforming means, said spring providing axial support for and cushioning said radiation receiving and transforming means.

18. A scintillation shock assembly according to claim 17, further comprising elastomeric potting material for encapsulating and cushioning said radiation receiving and transforming means, said potting material being encased within said shield.

19. A scintillation shock assembly according to claim 18, wherein said potting material is optically matched to said radiation receiving and transforming means, optically transparent to visible light and chemically non-reactive with interfacing surfaces.

20. A scintillation shock assembly according to claim 17, further comprising means for removing said radiation receiving and transforming means from said housing.

21. A scintillation shock assembly according to claim 20, wherein said means for removing said radiation receiving and transforming means includes:

said first optical coupling, said first optical coupling further including a first elastomeric interface and a first optical window, said first elastomeric interface being positioned between said radiation receiving and transforming means and said first optical window; and a second optical coupling transparent to said light impulses, said second optical coupling further including a second optical window and a second elastomeric interface, said second elastomeric interface being positioned between said first and second optical windows.

22. A scintillation shock assembly comprising:

a rigid scintillation shield for receiving means for receiving and transforming radiation into light impulses, said shield having an open end;

a first optical coupling transparent to said light impulses;

a radiation receiving and transforming means end cap;

a scintillation detector housing surrounding said shield; and wherein said shield is circumferentially supported within said detector housing by radially disposed shock absorbing means, said shield being axially biased toward said first optical coupling by said end cap.

23. An axial support system comprising:

an end member having an outer periphery;

a shield attached to said end member at said outer periphery thereof, said shield extending outwardly from said end member;

an element having a first and a second end;

a biasing member having a first end and a second end, said first end in contact with said end member and said second end exerting a biasing force against said element;

an elastomeric pad disposed between said end member and said first end of said element;

an optical coupler in contact with said second end of said element, said optical coupler having a plurality of concentric ridges extending outwardly from a surface thereof and in contact with said element;

an optical window in contact with said optical coupler; and a seal assembly disposed between said optical window and said shield.

24. The axial support system of claim 23, wherein said ridges are triangularly shaped.

25. The axial support system of claim 23, wherein one or more of said ridges have a flat surface extending generally parallel to said surface of said optical coupler.

26. The axial support system of claim 23, further comprising a lubricant disposed between said element and said optical coupler, wherein said ridges retain said lubricant.

* * * * *